United States Patent
Onder et al.

(10) Patent No.: US 10,066,572 B2
(45) Date of Patent: Sep. 4, 2018

(54) DUAL FUEL COMBUSTION ENGINE WITH FEEDBACK CONTROL OF COMBUSTION AND CORRESPONDING METHOD

(71) Applicant: ETH Zurich, Zurich (CH)

(72) Inventors: Christopher H Onder, Weisslingen (CH); Tobias Ott, Dietikon (CH)

(73) Assignee: ETH Zurich (CH)

( * ) Notice: Subject to any disclaimer, the term of this patent is extended or adjusted under 35 U.S.C. 154(b) by 136 days.

(21) Appl. No.: 14/915,074

(22) PCT Filed: Aug. 27, 2014

(86) PCT No.: PCT/EP2014/068142
§ 371 (c)(1),
(2) Date: Feb. 26, 2016

(87) PCT Pub. No.: WO2015/028495
PCT Pub. Date: Mar. 5, 2015

(65) Prior Publication Data
US 2016/0208731 A1    Jul. 21, 2016

(30) Foreign Application Priority Data

Aug. 27, 2013 (EP) .................................... 13004213

(51) Int. Cl.
*F02M 7/00* (2006.01)
*F02D 41/40* (2006.01)
(Continued)

(52) U.S. Cl.
CPC .......... *F02D 41/40* (2013.01); *F02D 35/023* (2013.01); *F02D 35/028* (2013.01);
(Continued)

(58) Field of Classification Search
CPC .. F02D 35/023; F02D 35/028; F02D 41/0025; F02D 41/0027; F02D 41/3047; F02D 41/40; Y02T 10/36; Y02T 10/44
(Continued)

(56) References Cited

U.S. PATENT DOCUMENTS 4,976,241 A * 12/1990 Ishida .................... F02P 5/1455
                                                    123/406.32
6,276,334 B1 * 8/2001 Flynn ...................... F02B 19/14
                                                    123/435
(Continued)

FOREIGN PATENT DOCUMENTS

| WO | 2005031134 | 4/2005 |
| WO | 2009143858 | 12/2009 |
| WO | 2012148396 | 11/2012 |

OTHER PUBLICATIONS

Leermakers et al., "Gasoline-Diesel Dual Fuel: Effect of Injection Timing and Fuel Balance", SAE Papers, Dec. 15, 2011, pp. 1-10; "Combustion Phasing"; p. 3-p. 4; figure 4.
(Continued)

*Primary Examiner* — Marguerite McMahon
*Assistant Examiner* — Tea Holbrook
(74) *Attorney, Agent, or Firm* — George Pappas (57) ABSTRACT

Feedback control of combustion in a gas diesel dual-fuel engine (20), based on the measured cylinder pressure, has been invented. The center of combustion and pressure rise rate is controlled by manipulating the start of diesel injection and duration of diesel injection. Measurements of transient engine operation show, that the proposed controller is able to control the center of combustion and the maximum pressure rise rate. The influence of changing intake manifold pressure, changing exhaust gas recirculation rate and changing air-fuel ratio can be compensated by the controller (10). Steady state measurements show that the gas diesel dual fuel
(Continued)

engine reaches efficiencies around 40% with stoichiometric air-fuel ratio and diesel ratios below 5%. The results have been obtained on a slightly modified production type common-rail diesel engine with four cylinders and a displacement volume of 2 liters.

20 Claims, 5 Drawing Sheets (51) Int. Cl.
F02D 41/30 (2006.01)
F02D 35/02 (2006.01)
F02D 41/00 (2006.01)

(52) U.S. Cl.
CPC ..... F02D 41/0027 (2013.01); F02D 41/3047 (2013.01); F02D 41/0025 (2013.01); Y02T 10/36 (2013.01); Y02T 10/44 (2013.01)

(58) Field of Classification Search
USPC ..... 123/435, 673, 299, 304, 445, 575, 179.7
See application file for complete search history.

(56) References Cited

U.S. PATENT DOCUMENTS

| | | | |
|---|---|---|---|
| 6,289,871 B1* | 9/2001 | Brown | F02D 19/0628 123/299 |
| 6,659,071 B2* | 12/2003 | LaPointe | F02B 1/04 123/295 |
| 7,325,529 B2* | 2/2008 | Ancimer | F02B 23/0675 123/299 |
| 9,464,583 B2* | 10/2016 | zur Loye | F02D 41/0027 |
| 2002/0007816 A1* | 1/2002 | Zur Loye | F02B 1/04 123/295 |
| 2003/0188714 A1* | 10/2003 | Yamamoto | F02D 35/023 73/114.09 |
| 2007/0028899 A1* | 2/2007 | Allen | F02D 41/345 123/494 |
| 2012/0103304 A1* | 5/2012 | Kang | F02D 35/023 123/305 |

OTHER PUBLICATIONS

Henningsson, M., "Data-Rich Multivariable Control of Heavy-Duty Engines", 190 pages, ISSN 0280-5316, May 2012; p. 150; figure 8.13.

Schnorbus et al., "Weltweit unterschiedliche Kraftstoffqualitäten—Neue Anforderungen an die Verbrennungsregelung beim modernen Dieselmotor", MTZ Motortechnische Zeitschrift. Vieweg Verlag, Wiesbaden, DE, vol. 69, No. 4, Apr. 1, 2008, pp. 302-312, ISSN 0024-8525; pp. 308-311; figures 7, 8.

Eichmeier, J., Wagner, U., and Spicher, U., "Controlling Gasoline Low Temperature Combustion by Diesel Micro Pilot Injection", ASME 2011.

International Energy Agency, CO2 Emissions from Fuel Combustion, 2011 edition, 134 pages.

Semin, R.A.B., "A Technical Review of Compressed Natural Gas as an Alternative Fuel for Internal Combustion Engines", American J. of Engineering and Applied Sciences 1(4), 302-311, 2008.

Serrano and Bertrand, "Exploring the Potential of Dual Fuel Diesel—CNG Combustion for Passenger Car Engine", IFAC 2012.

Olsson, J., Tunestal, B., and Johansson, B., "Closed-Loop Control of an HCCI Engine", SAE Transactions, 110(3), 1076-1085, 2001.

* cited by examiner

DUAL FUEL COMBUSTION ENGINE WITH FEEDBACK CONTROL OF COMBUSTION AND CORRESPONDING METHOD

This application claims priority from PCT application No. PCT/EP2014/068142 filed Aug. 27, 2014 which claims priory from European application No. EP 13004213.8 filed on Aug. 27, 2013, the disclosures of which are incorporated herein by reference.

TECHNICAL FIELD

The invention is related to a dual combustion fuel engine with feedback control of combustion. Furthermore, the invention relates to a method operating a dual fuel combustion engine with feedback control of combustion and a feedback control of combustion device or arrangement for a dual fuel combustion engine.

BACKGROUND OF THE INVENTION

Road transportation is responsible for 17% of worldwide emissions of carbon dioxide, according to the report of the International Energy Agency, 2011a. Passenger light-duty vehicles account for 60% of that amount. The number of these vehicles is assumed to double between 2010 and 2035 due to their fast growing number in emerging countries, according to the report of the Intentional Energy Agency, 2011b. Reducing the $CO_2$ emissions of passenger light-duty vehicles is thus a major task toward achieving the long-term goal of reducing total carbon dioxide emissions. Using compressed natural gas (CNG) instead of gasoline or diesel is one attractive option to reduce the $CO_2$ emissions of passenger and light-duty vehicles. CNG mainly consists of methane which has a higher hydrogen to carbon (H to C) ratio compared to gasoline or diesel. This higher H to C ratio of methane leads to a reduction of $CO_2$ emissions in the order of 20-25%, for the same engine-efficiency, according to Semin, R. (2008), "A technical review of compressed natural gas as an alternative fuel for internal combustion engines" Am. J. Engg. & Applied Sci, 1(4), 302-311. Among all possible gas engines, the dual fuel engine is one of the most promising. In the dual fuel engine, the gas is injected into the intake manifold. The premixed air-gas mixture is then ignited with a small amount of directly injected diesel. This engine has the potential of achieving diesel-like efficiencies without the need for a lean de-NOX system, according to Serrano and Bertrand, 2012, "Exploring the potential of dual fuel diesel-CNG combustion for passenger car engine", in IFAC 2012.

Combustion in the gas/diesel dual fuel engine has been extensively investigated. It has been found, that even if the ratio of diesel fuel to total fuel mass is very small, the influence of the diesel injection on the whole combustion is large. More specifically, the sensitivity of combustion phasing and combustion noise on start of injection is high. (Serrano and Bertrand). The start of combustion depends on the start of injection of the diesel and on the ignition delay of the diesel. The latter is mainly dependant on the chemical reaction kinetics of the diesel fuel. This process is very sensitive to small changes in pressure, temperature or cylinder charge composition.

Combustion processes which are prone to external disturbances can best be controlled by using feedback control based on the measured cylinder pressure. Feedback control based on the measured cylinder pressure has been applied successfully to conventional diesel engines, as disclosed in WO 2009/143 858 A1. It has also been applied to the control of HCCI engines, as by Olsson, J., Tunestal, P., Johansson, B., et al. (2001) in "Closed-loop control of an hcci engine" SAE TRANSACTIONS, 110(3), 1076-1085, as an example. And it has also been applied to many other combustion types.

SUMMARY OF THE INVENTION

According to a first aspect the invention has the object to provide a gas diesel dual fuel engine having a feedback control of combustion based on the measured cylinder pressure to control the combustion phasing and combustion noise. Furthermore, according to a second aspect, the invention has the object to provide a method of feedback control of combustion based on the measured cylinder pressure to control the combustion phasing and combustion noise in a gas diesel dual fuel engine. According to a third aspect, the invention has the object to provide respective feedback control device or arrangement.

The main fuel is any fuel having good mixture characteristic with air and a low auto-ignition characteristic, preferably compressed natural gas, which is injected into the intake manifold. It should be noted that other low ignition gases like gasified gasoline, can be used instead. The second fuel is any fuel having a high auto-ignition characteristic, preferably diesel which is directly injected into the combustion chamber.

The goal of the control design is to minimize the diesel quantity using the center of combustion (COC) and, according to a preferred embodiment of the invention, the maximum pressure rise rate ($dp_{max}$) as parameters. The center of combustion is the point, where 50% of the fuel-energy is released. The maximum pressure rise rate is the maximum rise rate of the cylinder pressure evaluated over one engine cycle.

The controlled variables z are therefore $$z = \begin{bmatrix} COC \\ dp_{max} \end{bmatrix} \quad (1)$$

In this preferred embodiment of the invention, these two variables ensuring an efficient combustion with acceptable noise level. The center of combustion and maximum pressure rise rate are controlled by manipulating the start of diesel injection SOI and the duration of diesel injection DOI. The manipulated values are therefore $$v = \begin{bmatrix} SOI \\ DOI \end{bmatrix} \quad (2)$$

The center of combustion (COC) and maximum pressure rise rate ($dp_{max}$) are obtained from the measured cylinder pressure ($p_{cyl}$). Preferably, each cylinder is controlled individually and independently from the other cylinders.

It should be noted that the start of injection value is considered as an angle of the combustion cycle of the respective cylinder and is considered to have any phase value, especially when the start of injection value is used to calculate an one to one and onto (bijective) function at least for a duration of injection value above a predetermined duration minimum. According to the easiest version of this function is a constant quotient (DOI=b*SOI+c). In a more advanced version it can be a bijective polynomial function comprising the terms $DOI=a*SOI^2+b*SOI+c$ with the parameters a, b, and c selected that the function is bijective in the range of interest of SOI. Furthermore, a function $DOI=d1*e^{d2*SOI+d3}$ is a candidate for a bijective function, when the parameters d1 and d2 are selected appropriately.

The aforementioned elements as well as those claimed and described in the following exemplary embodiments, to be used according to the invention, are not subject to any particular conditions by way of exclusion in terms of their size, shape, use of material and technical design, with the result that the selection criteria known in the respective field of application can be used without restrictions. It should be noted that all means used to implement the invention are not limited to a particular design but can be provided as digital, analog or hybrid means having A/D and D/A conversion means at several points.

BRIEF DESCRIPTION OF THE DRAWINGS

Examples of the engine will hence forth be described in more detail by reference to the drawings, wherein are shown:

FIG. 5a to 5c show diagrams of the controller design wherein

DETAILED DESCRIPTION OF THE PREFERRED EMBODIMENTS

All embodiments described hereby are related to a 4-cylinder diesel engine 21 with a displacement volume of 2.0 liters. The engine 21 according to the described embodiment is equipped with a common rail diesel injection system a VTG-turbocharger and a high pressure EGR system. Table 1 gives additional details on the engine.

TABLE 1

Data of the engine used for measurements

| | |
|---|---|
| Manufacturer | Volkswagen |
| Type | TDI 2.0 - 475 NE (CJDA) Industrial Engine |
| Cylinders | 4 |
| Displ. Volume | 1.968 l |
| Bore | 81.0 mm |
| Stroke | 95.5 mm |
| Compression Ratio | 16.5 |
| Injection System | Bosch Common Rail |
| Diesel Injectors | Piezo |
| max pressure | 1800 bar |

In comparison with the series production engine, the following modifications have been made:
- port-fuel injection system for natural gas
- installation of low-pressure EGR system, the available high-pressure EGR system is not used for the presented measurements
- cylinder-pressure sensors 22 in all four cylinders Modelling Combustion in an internal combustion engine is an inherently discrete system. It is assumed, that the combustion at time k+1 only depends on the input at time k. The combustion properties $z_{k+1}$, can thus be expressed as a function of the previous input $v_k$.

$$z_{k+1} = f(v_k) \quad (3)$$

where:

$$z = \begin{bmatrix} COC \\ dp_{max} \end{bmatrix} \text{ and } v = \begin{bmatrix} SOI \\ DOI \end{bmatrix} \quad (4)$$

The influence of the combustion of the last cycle ($z_k$) is neglected. All other influences such as intake pressure, air/fuel ratio, exhaust gas recirculation rate and others are neglected too.

Identification

Figure 1:
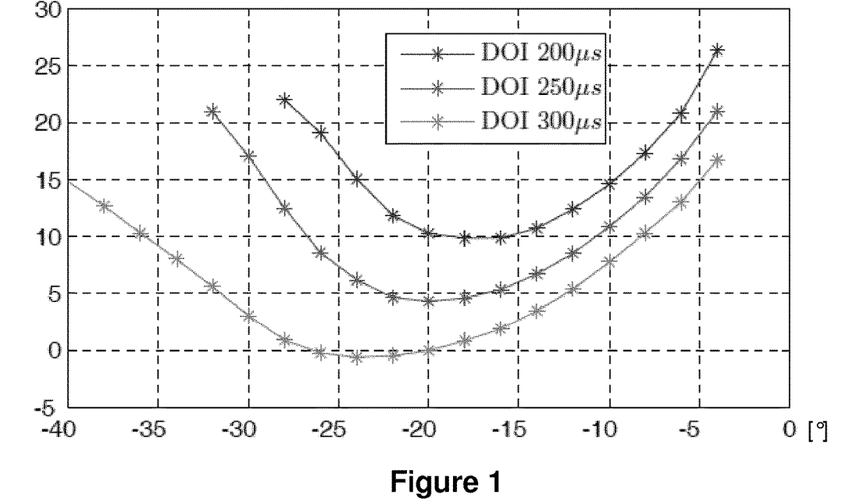
FIG. 1 is a diagram of the Center of Combustion (COC) as the axis of ordinate over the Start of Injection (After Top dead Center/ADTC) as the axis of abscissae, both in phase angles

The function f in equation (3) is identified using measurements. FIG. 1 shows one part of the result of the measurements. The figure shows the dependency of the center of combustion on the duration of injection and start of injection. The center of combustion is always advanced, if the injection duration is increased. The dependency of the center of combustion on the start of injection is more complicated. For late injection, the center of combustion is advanced, if the start of injection is advanced. But for early injection, the center of combustion is retarded, if the start of injection is advanced. For any injection duration, there exists a start of injection, which leads to the earliest possible center of combustion for that injection duration. A physical explanation for such a phenomena can be found in Eichmeier, J., Wagner, U., and Spicher, U. (2011). "Controlling gasoline low temperature combustion by diesel micro pilot injection", ASME 2011.

Linearization

The system is linearized around an operating point $z_0$ with corresponding input $v_0$. The function f(v) can be approximated by:

$$f(v) \approx B(v_0) \cdot (v - v_0) + f(v_0) \tag{5}$$

$$B(v_0) = \frac{\partial f}{\partial v} \bigg|_{v=v_0} \tag{6}$$

The deviation from the nominal operating point is described as: $x=z-z_0$. The deviation of the control from the nominal value is described by: $u=v-v_0$. The resulting system equation in state space form is given by:

$$x_{k+1} = 0 \cdot x_k + B \cdot u_k$$

$$y_k = C \cdot x_k \tag{7}$$

where C=I. The discrete time state space model can be transformed into a discrete time transfer function:

$$\frac{Y(z)}{U(z)} = P(z) = \begin{bmatrix} p_{11} & p_{12} \\ p_{21} & p_{22} \end{bmatrix} \cdot \frac{1}{z} \tag{8}$$

where $$\begin{bmatrix} p_{11} & p_{12} \\ p_{21} & p_{22} \end{bmatrix} = B = \begin{bmatrix} \frac{\partial f_1}{\partial v_1} & \frac{\partial f_1}{\partial v_2} \\ \frac{\partial f_2}{\partial v_1} & \frac{\partial f_2}{\partial v_2} \end{bmatrix}_{v=v_0} \tag{9}$$

The derivatives $$\frac{\partial f_i}{\partial v_j} \bigg|_{v=v_0}$$

are obtained from the measured function f by finite differences. The dependency of the center of combustion on the start of injection which has been shown in FIG. 1 leads to a sign change in $p_{11}$ depending on the linearization point. This sign change renders control a difficult task. The sign change, however can be eliminated by an appropriate input transformation.

Input Transformation

FIG. 1 showed that for any duration of injection, there exists a start of injection (SOI*) which leads to the earliest possible center of combustion.

$$SOI^* = f_{SOI}(DOI) \tag{10}$$

This is the combination of SOI and DOI which leads to the lowest possible diesel quantity for a desired center of combustion. A new input a is defined which is related to the input u by:

$$u = \begin{bmatrix} SOI \\ DOI \end{bmatrix} = \begin{bmatrix} \tilde{u} \\ f_{SOI}^{-1}(\tilde{u}) \end{bmatrix} \tag{11}$$

Figure 2:
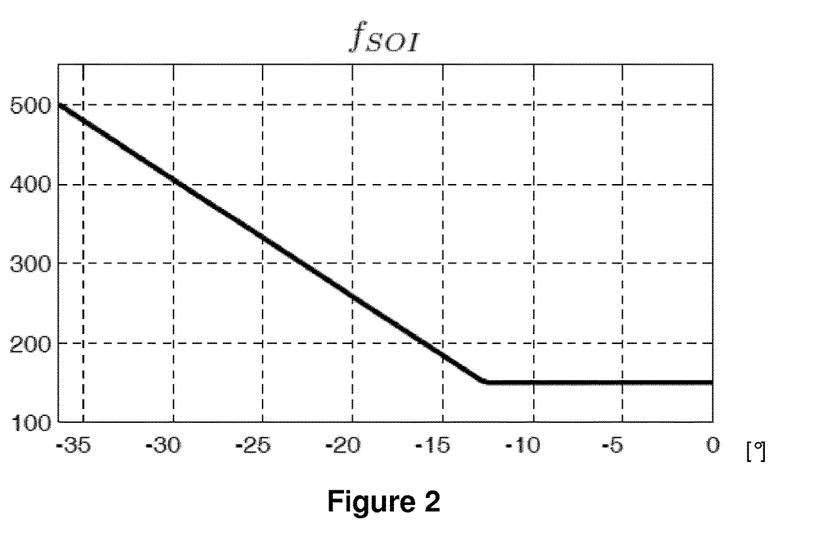
FIG. 2 shows the line (linearized) of the first Start of Injection in a diagram of the Duration of injection as the axis of ordinate in microseconds over the Start of Injection as the axis of abscissae, latter in phase angles

The function $f_{SOI}$ can well be approximated by an affine function. FIG. 2 shows the approximation. The minimal DOI is limited to 150 μs. This minimal DOI value is introduced in order to avoid operation of the injectors at very short injection durations, where the cycle to cycle variation of injected diesel quantity is large.

The input transformation leads to a transformed system $\tilde{P}(z)$:

$$\frac{Y(z)}{\tilde{U}(z)} = \tilde{P}(z) = \begin{bmatrix} p_1 \\ p_2 \end{bmatrix} \cdot \frac{1}{z} = \begin{bmatrix} p_{11} & p_{12} \\ p_{21} & p_{22} \end{bmatrix} \cdot \begin{bmatrix} 1 \\ \frac{\partial f_{SOI}^{-1}}{\partial SOI} \end{bmatrix} \cdot \frac{1}{z} \tag{12}$$

The transformed system $\tilde{P}$ has no sign change ($p_1>0$, $p_2<0$), for all possible linearization points. Further on, the proposed input transformation leads to control of combustion with minimal diesel quantity.

Controller Structure

Figure 3:
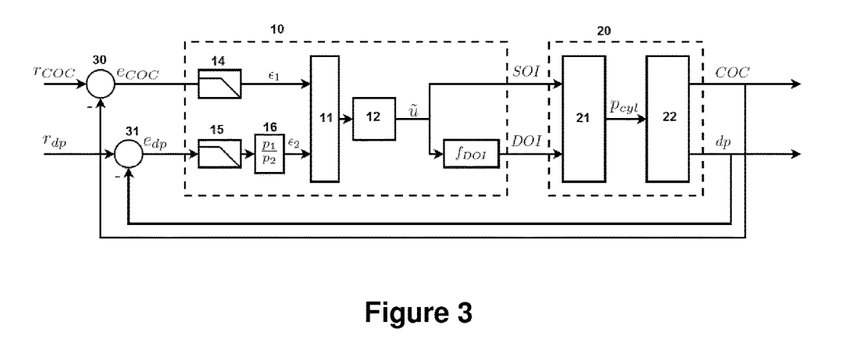
FIG. 3 shows the controller structure of a preferred embodiment of the invention including a limitation of the maximum pressure rise rate

FIG. 3 shows the structure of the control system. Both errors $e_{COC}, e_{dp}$, derived by the comparison of the measured values COC and dp with the parameters $r_{COC}$ and $r_{dp}$, respectively, are filtered using a low-pass filter, 14 and 15 respectively. The parameters $r_{COC}$ and $r_{dp}$ are the reference values of the center of combustion and the maximum pressure rise rate. The signal $e_{dp}$ is then multiplied by p1/p2 according to the transfer input function harmonization means 16 ensuring that the transfer function ($\tilde{u} \rightarrow \varepsilon_1$) is equal to the transfer function ($\tilde{u} \rightarrow \varepsilon_2$). This enables the use of one single controller.

The input to the controller 12 is the maximum of $\varepsilon_1$ and $\varepsilon_2$, according to the limiting means 11. This leads to the following behaviour:

$$COC = r_{COC} \text{ and } dp_{max} < r_{dp}$$

or $$COC > r_{COC} \text{ and } dp_{max} = r_{dp} \tag{13}$$

The controller also includes the input transformation as described above.

Controller Design

The controller is a PI-Controller. The discrete time transfer function of the controller is given by:

$$C(z) = kp \cdot \left(1 + \frac{1}{T_I} \cdot \frac{1}{z-1}\right) \tag{14}$$

The controller parameters ($k_p$, $T_I$) as well as the time constant of the low-pass filters are chosen based on the following specifications:

Stepwise disturbances are reduced to 10% within 10 engine cycles.

Phase margin $\phi \geq 60°$.

The phase margin is also maintained for large uncertainties in the gain of the plant ($p_1$, $p_2$)

The frequency response and the disturbance rejection of the design can be seen in FIG. 4.

Experimental Results

Transient

Figure 4A:
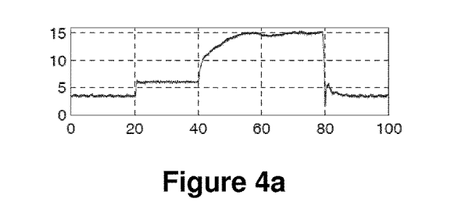
FIG. 4a to 4h show diagrams of the measurement results with the time in seconds as the axis of abscissae, wherein 4a is a diagram of the break mean effective pressure in bar 4b is a diagram of the intake manifold pressure in bar 4c is a diagram of the air/fuel ratio 4d is a diagram of the exhaust gas recirculation rate in percent 4e is a diagram of the measured center of combustion 4f is a diagram of the maximum pressure rise rate in bar/degree 4g is a diagram of the start of injection in degree 4h is a diagram of the duration of injection in microseconds
Figure 4B:
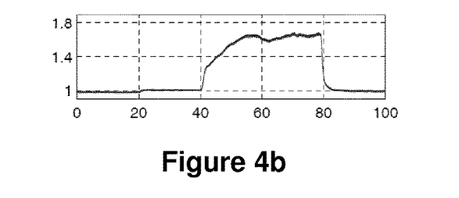
Figure 4C:
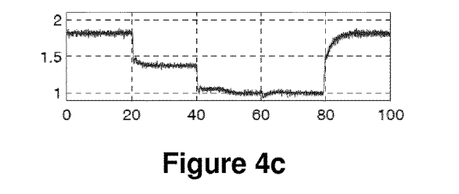
Figure 4D:
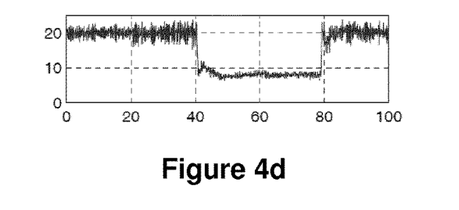
Figure 4E:
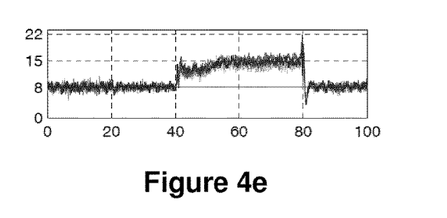
Figure 4F:
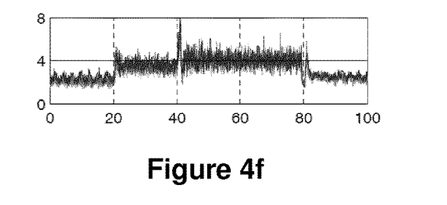
Figure 4G:
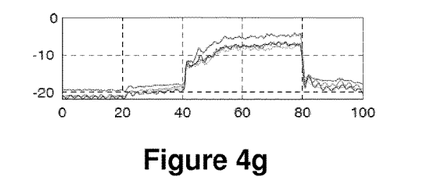
Figure 4H:
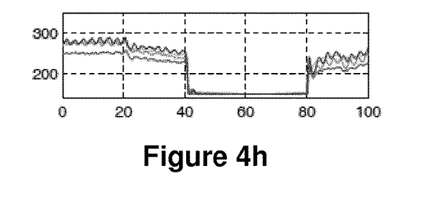

FIGS. 4a to 4h show results of transient engine operation at a constant engine speed of 2000 rpm. Load-steps are applied to validate the combustion controller. The load is increased after 20 seconds and again after 40 seconds and is reduced to its initial value after 80 seconds. The first four diagrams 4a to 4d show the brake mean effective pressure (load), the intake manifold pressure, the air-fuel ratio and the exhaust gas recirculation rate. All values change as a consequence of the loadsteps. These changes are disturbances on the center of combustion and maximum pressure rise rate. The resulting center of combustion, the maximum pressure rise rate, the start of injection and the duration of injection are shown by diagrams 4e to 4h. The results are given individually for all four cylinders. FIG. 4e shows the center of combustion. At the beginning, the load is low and the center of combustion remains at its nominal value of 8°. The small load step after 20 seconds is hardly visible. After 40 seconds, the load is increased to 15 bar break-mean effective pressure. As a consequence, the center of combustion is retarded because combustion is limited by the maximum pressure rise rate of 4 bar/°. After 80 seconds, the load is reduced and the center of combustion is brought back to its nominal value. FIG. 4f shows the maximum pressure rise rate over time. At the beginning, the maximum pressure rise rate is below its nominal value of 4 bar/°. After 20 seconds, the load is increased which also increases the maximum pressure rise rate, but it still remains below its nominal value. After 40 seconds, the increasing loads lead to an increase of the maximum pressure rise rate far above its nominal value. But the value is reduced by the controller to its nominal value within short time. Between 40 and 80 seconds, the maximum pressure rise rate is controlled to its nominal value, as a consequence, the center of combustion is retarded. FIG. 4g shows the start of injection of the diesel injection. The small load step after seconds requires only little change in the start of injection to maintain the center of combustion at its nominal value. The second step after 40 seconds requires a change of the center of combustion of more than 10°, to keep the maximum pressure rise rate at its nominal value. After 80 seconds, the engine load is set to the same value as at the beginning. However, the start of injection is retarded compared to the value at the beginning. The reason is the increased engine temperature due to the previous operation at high load. This higher temperature leads to a faster auto-ignition of the diesel. FIG. 4h shows the duration of the diesel injection. The duration of injection is directly coupled to the start of injection through the function $f_{DOI}$ shown in FIG. 2.

Steady State

Figure 5A:
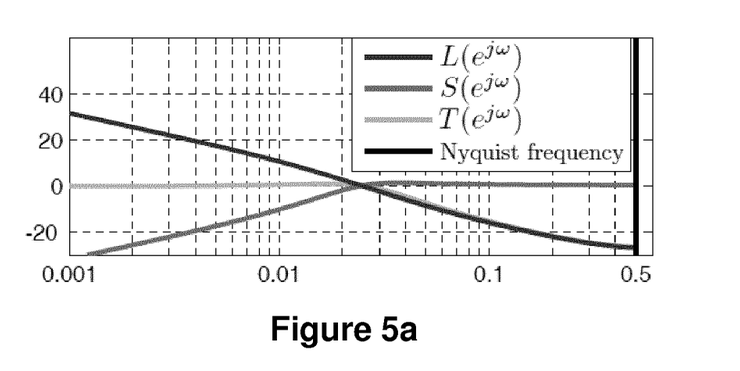
FIG. 5a is a diagram of the frequency response of the controller with the gain as the axis of ordinate in decibel over the frequency as the axis of abscissae
Figure 5B:
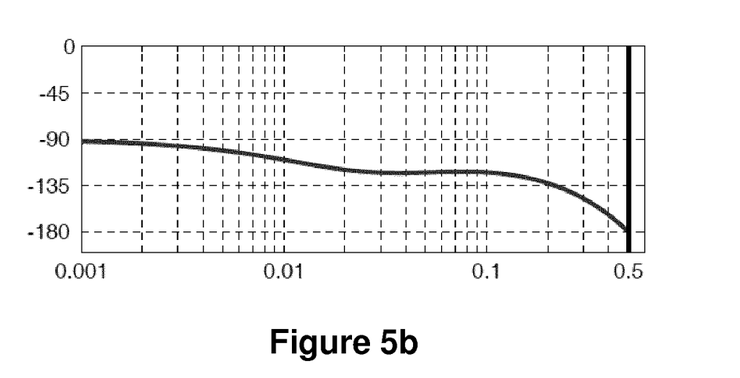
FIG. 5b is a diagram with the phase angle as the axis of ordinate over the sampling frequency as the axis of abscissae
Figure 5C:
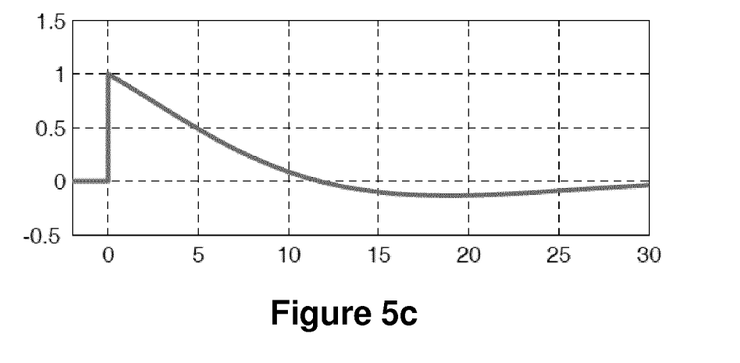
FIG. 5c is a diagram of the disturbance rejection y(k) over the number of engine cycle
Figure 6A:
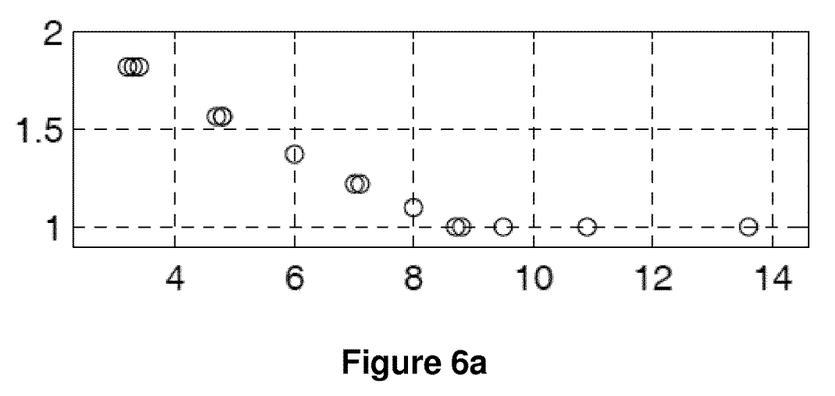
FIG. 6a to 6e show diagrams of steady state measurement results with brake mean effective pressure values in bar as the axis of abscissae, wherein 6a is a diagram of the air/fuel ratio 6b is a diagram of the center of combustion 6c is a diagram of the maximum pressure rise rate in bar/degree 6d is a diagram of the diesel ratio in percent 6e is a diagram of the engine efficiency.
Figure 6B:
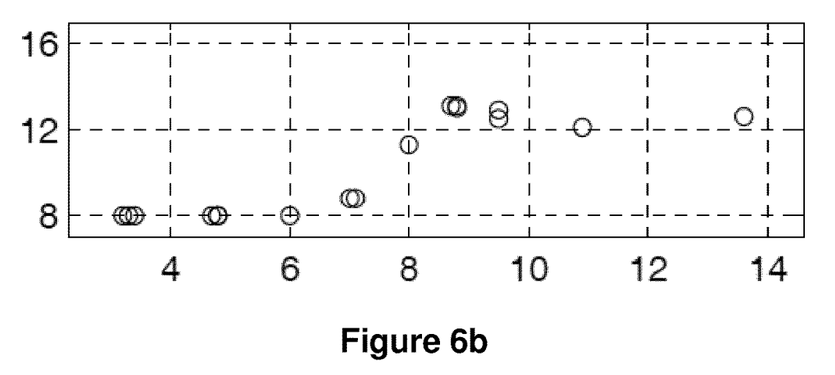

FIGS. 6a to 6e show measurements taken at constant operating points. The shown measurements are averaged over 60 seconds. Engine speed is 2000 rpm for all measurements, while the break mean effective pressure (load) is varied. FIG. 5a shows the air-fuel ratio. The engine is operated lean at low loads and is operated stoichiometric above 9 bar brake mean effective pressure. This enables exhaust gas after treatment with a three way catalytic converter at medium to high loads. FIG. 6b shows the center of combustion for various loads. At low loads, the center of combustion is at its nominal value of 8°. At higher loads combustion is retarded, to keep the maximum pressure rise rate at its nominal value. The center of combustion is latest at 9 bar brake mean effective pressure. The reason for that is, that the engine is operated stoichiometrically with high rates of recirculated exhaust gases at this point, but the intake manifold pressure is still moderate (=1 bar). These conditions increase the ignition delay of the diesel and, accordingly, a larger diesel quantity is required. The larger diesel quantity leads to a faster combustion. This requires a later center of combustion to keep the maximum pressure gradient within the limit. At higher loads, the intake pressure is higher and the egr rates are smaller which promotes the diesel autoignition.

Figure 6C:
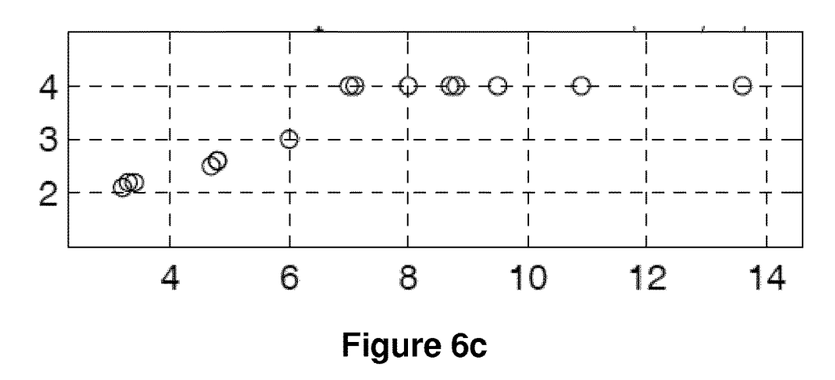

FIG. 6c shows the maximum pressures rise rate for various loads. At low loads, the maximum pressure rise rate is below its nominal value. At higher load, the combustion is limited by the maximum pressure rise rate.

Figure 6D:
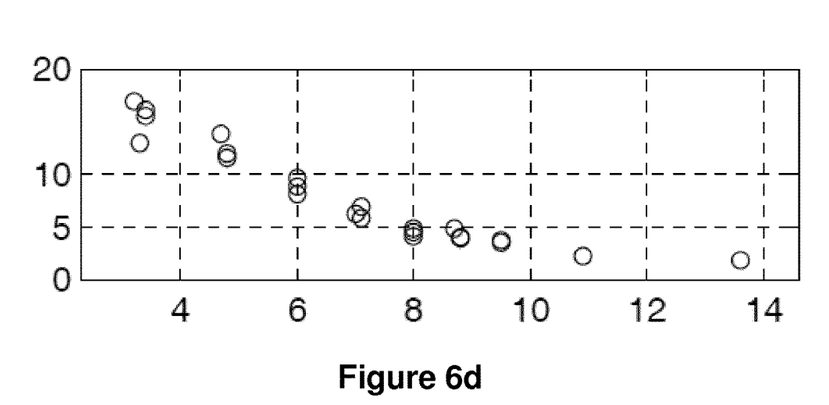

FIG. 6d shows the ratio of the diesel fuel to the total fuel energy ($r_D$). The value $r_D$ is defined as:

$$r_D = \frac{m_D \cdot H_{uD}}{m_D \cdot H_{uD} + m_{CNG} \cdot H_{uCNG}} \quad (15)$$

wherein $m_D$ is the mass of diesel fuel, $H_{uD}$ is the lower heating value of diesel, $m_{CNG}$ is the mass of natural gas and $H_{uCNG}$ is the lower heating value of natural gas. The energetic ratio of diesel is around 15% for a brake mean effective pressure of 3 bars. With increasing loads, the energetic diesel ratio $r_D$ is constantly decreasing to values below 2% for high loads.

Figure 6E:
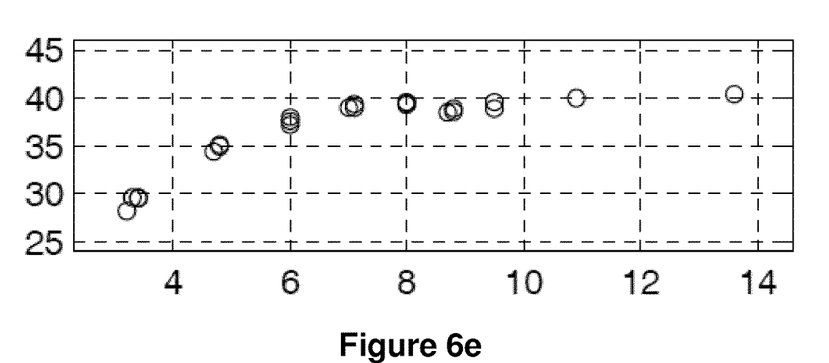

FIG. 6e shows the measured brake efficiency. The measured efficiency reaches maximum values around 40%.

LIST OF REFERENCE SIGNS

10 Controller
11 Limiting means
12 Device
14 low pass filter
15 second low pass filter
16 Transfer input function harmonization means
21 Engine
22 Center of combustion determination means
30 comparisation means
31 additional comparisation means

The invention claimed is:
1. Dual fuel combustion engine having at least one cylinder with feedback control of combustion means, wherein the dual fuel combustion engine is provided with means for adding a first fuel to an air intake of said at least one cylinder and fuel injection means for injecting a second fuel into the cylinder for ignition, said feedback control of combustion means comprising
a cylinder pressure sensor for at least one cylinder for measuring the cylinder pressure,
center of combustion evaluating means for detecting the center of combustion using the cylinder pressure values measured by said cylinder pressure sensor,
comparison means for comparison of said center of combustion values detected by said center of combustion evaluating means with a predetermined center of combustion value, said comparison means outputting the difference as an error value,
low pass filtering means for low pass filtering said output of said comparison means,
wherein said fuel injection means for injecting a second fuel into the cylinder is controlled by the output of said low pass filtering means,
characterized in that
a control signal splitting means is provided between said low pass filtering means and said fuel injection means,
wherein said control signal splitting means is provided to output a start of injection value and a duration of injection value to said fuel injection means using said output of said low pass filtering means,
wherein said fuel injection means is provided to inject said second fuel at the commanded start time for the commanded duration of injection outputted by said control signal splitting means, and wherein the function of said start of injection value in relation to said duration of injection value is a bijective function at least for a duration of injection value above a predetermined duration minimum.

2. The dual fuel combustion engine according to claim 1, characterized in that said function of said start of injection value in relation to said duration of injection value is a quotient held substantially constant at least for a duration of injection value above a predetermined duration minimum.

3. The dual fuel combustion engine according to claim 2, characterized in that said feedback control of combustion means further comprise pressure rise rate determination means to determine and output a pressure rise rate,
additional comparison means for comparison of said pressure rise rate with a predetermined pressure rise rate, said additional comparison means outputting the difference as a second error value,
second low pass filtering means for low pass filtering said output of said additional comparison means,
transfer function harmonizing means for harmonizing the transfer function of said second low pass filtering means so that it is equivalent to the transfer function of said low pass filtering means, and
limitation means to limit the input value of said control signal splitting means.

4. The dual fuel combustion engine according to claim 1, characterized in that said function of said start of injection value in relation to said duration of injection value includes a polynomial with at least the terms $$DOI=a*SOI^2+b*SOI+c.$$

5. The dual fuel combustion engine according to claim 4, characterized in that said feedback control of combustion means further comprise pressure rise rate determination means to determine and output a pressure rise rate,
additional comparison means for comparison of said pressure rise rate with a predetermined pressure rise rate, said additional comparison means outputting the difference as a second error value,
second low pass filtering means for low pass filtering said output of said additional comparison means,
transfer function harmonizing means for harmonizing the transfer function of said second low pass filtering means so that it is equivalent to the transfer function of said low pass filtering means, and
limitation means to limit the input value of said control signal splitting means.

6. The dual fuel combustion engine according to claim 1, characterized in that said feedback control of combustion means further comprise pressure rise rate determination means to determine and output a pressure rise rate,
additional comparison means for comparison of said pressure rise rate with a predetermined pressure rise rate, said additional comparison means outputting the difference as a second error value,
second low pass filtering means for low pass filtering said output of said additional comparison means,
transfer function harmonizing means for harmonizing the transfer function of said second low pass filtering means so that it is equivalent to the transfer function of said low pass filtering means, and
limitation means to limit the input value of said control signal splitting means.

7. The dual fuel combustion engine according to claim 1 characterized in that said feedback control of combustion means are provided for each cylinder individually.

8. A feedback control method for a dual fuel combustion engine having at least one cylinder, wherein the dual fuel combustion engine is provided with means for adding a first fuel to an air intake of said at least one cylinder and fuel injection means for injecting a second fuel into the cylinder for ignition, said method comprising measuring the cylinder pressure of at least one cylinder,
detecting the center of combustion using the cylinder pressure values measured,
comparing said center of combustion values with a predetermined center of combustion value, and outputting the difference as an error value,
low pass filtering said center of combustion values by means of a low pass filter, and
controlling the injection of said second fuel into the cylinder by the output of said low pass filtered values,
determining and outputting a start of injection value and a duration of injection value to said fuel injection means using said low pass filtered values, injecting said second fuel at a time corresponding to said start of injection value and for a duration time corresponding to said duration of injection value,
wherein the function of said start of injection value in relation to said duration of injection value is a bijective function at least for a duration of injection value above a predetermined duration minimum.

9. The feedback control method according claim 8, characterized in that said function of said start of injection value in relation to said duration of injection value is a quotient held substantially constant at least for a duration of injection value above a predetermined duration minimum.

10. The feedback control method according to claim 9, characterized in that a pressure rise rate is determined in addition to the center of combustion value
said pressure rise rate is compared with a predetermined pressure rise rate and the respective difference is used as a second error value,
said second error value is low pass filtered by means of a second low pass filter,
the transfer function of said low pass filter is harmonized to render it equivalent to the transfer function of said second low pass filtering,
said start of injection value and said duration of injection value are determined from a value which is limited to the maximum of both low pass filtered and harmonized values.

11. The feedback control method according to claim 8, characterized in that said function of said start of injection value in relation to said duration of injection value includes a polynomial with at least the terms $$DOI=a*SOI^2+b*SOI+c.$$

12. The feedback control method according to claim 11, characterized in that a pressure rise rate is determined in addition to the center of combustion value
said pressure rise rate is compared with a predetermined pressure rise rate and the respective difference is used as a second error value,
said second error value is low pass filtered by means of a second low pass filter, the transfer function of said low pass filter is harmonized to render it equivalent to the transfer function of said second low pass filtering, said start of injection value and said duration of injection value are determined from a value which is limited to the maximum of both low pass filtered and harmonized values.

13. The feedback control method according to claim 8, characterized in that a pressure rise rate is determined in addition to the center of combustion value said pressure rise rate is compared with a predetermined pressure rise rate and the respective difference is used as a second error value, said second error value is low pass filtered b means of a second low pass filter, the transfer function of said second low pass filter is harmonized to render it equivalent to the transfer function of said low pass filtering, said start of injection value and said duration of injection value are determined from a value which is limited to the maximum of both low pass filtered and harmonized values.

14. The feedback control method according to claim 8, characterized in that said feedback control of combustion is performed for each cylinder individually.

15. A feedback control of combustion device or arrangement for a dual fuel combustion engine said dual fuel combustion engine having at least one cylinder and is provided with means for adding a first fuel to an air intake of said at least one cylinder and fuel injection means for injecting a second fuel into the cylinder for ignition, said feedback control of combustion device or arrangement comprising a cylinder pressure sensor means for at least one cylinder for measuring the cylinder pressure, center of combustion evaluating means for detecting the center of combustion using the cylinder pressure values measured by said cylinder pressure sensor, comparison means for comparison of said center of combustion values detected by said center of combustion evaluating means with a predetermined center of combustion value, said comparison means outputting the difference as an error value, low pass filtering means for low pass filtering said output of said comparison means, wherein said fuel injection means for injecting a second fuel into the cylinder is controlled by the output of said low pass filtering means, characterized in that a control signal splitting means is provided between said low pass filtering means and said fuel injection means, wherein said control signal splitting means is provided to output a start of injection value and a duration of injection value to said fuel injection means using said output of said low pass filtering means, wherein said fuel injection means is provided to inject said second fuel at the commanded start time for the commanded duration of injection outputted by said control signal splitting means, and wherein the function of said start of injection value in relation to said duration of injection value is a bijective function at least for a duration of injection value above a predetermined duration minimum.

16. The feedback control of combustion device or arrangement according to claim 15, characterized in that said function of said start of injection value in relation to said duration of injection value is a quotient held substantially constant at least for a duration of injection value above a predetermined duration minimum.

17. The feedback control of combustion device or arrangement according to claim 16, further comprising pressure rise rate determination means to determine and output a pressure rise rate, additional comparison means for comparison of said pressure rise rate with a predetermined pressure rise rate, said additional comparison means outputting the difference as a second error value, second low pass filtering means for low pass filtering said output of said additional comparison means, transfer function harmonizing means for harmonizing the transfer function of said second low pass filtering means so that it is equivalent to the transfer function of said low pass filter, and limitation means to limit the input value of said control signal splitting means.

18. The feedback control of combustion device or arrangement according to claim 15, characterized in that said function of said start of injection value in relation to said duration of injection value includes a polynomial with at least the terms $$DOI=a*SOI^2+b*SOI+c.$$

19. The feedback control of combustion device or arrangement according to claim 18, further comprising pressure rise rate determination means to determine and output a pressure rise rate, additional comparison means for comparison of said pressure rise rate with a predetermined pressure rise rate, said additional comparison means outputting the difference as a second error value, second low pass filtering means for low pass filtering said output of said additional comparison means, transfer function harmonizing means for harmonizing the transfer function of said second low pass filtering means so that it is equivalent to the transfer function of said low pass filter, and limitation means to limit the input value of said control signal splitting means.

20. The feedback control of combustion device or arrangement according to claim 15, further comprising pressure rise rate determination means to determine and output a pressure rise rate, additional comparison means for comparison of said pressure rise rate with a predetermined pressure rise rate, said additional comparison means outputting the difference as a second error value, second low pass filtering means for low pass filtering said output of said additional comparison means, transfer function harmonizing means for harmonizing the transfer function of said low pass filtering means is equivalent to the transfer function of said second low pass filter, and limitation means to limit the input value of said control signal splitting means.

* * * * *

UNITED STATES PATENT AND TRADEMARK OFFICE
CERTIFICATE OF CORRECTION

PATENT NO.        : 10,066,572 B2
APPLICATION NO.   : 14/915074
DATED             : September 4, 2018
INVENTOR(S)       : Christopher H. Onder et al.

It is certified that error appears in the above-identified patent and that said Letters Patent is hereby corrected as shown below:

In the Specification

Column 5, Line 58, delete "input a" and insert --input ũ--

Column 7, Line 29, after "after", insert --20--

In the Claims

Claim 13, Column 11, Line 15, delete "b" and insert --by--

Signed and Sealed this
Sixteenth Day of October, 2018

Andrei Iancu
*Director of the United States Patent and Trademark Office*